United States Patent [19]

Kovac

[11] 3,746,883

[45] July 17, 1973

[54] CHARGE TRANSFER CIRCUITS

[75] Inventor: Michael George Kovac, Princeton Junction, N.J.

[73] Assignee: RCA Corporation, Princeton, N.J.

[22] Filed: Oct. 4, 1971

[21] Appl. No.: 186,078

[52] U.S. Cl. .......... 307/221 D, 307/221 C, 328/159
[51] Int. Cl. .......... G11c 11/40
[58] Field of Search .......... 307/216, 221 R, 221 C, 307/293, 221 D; 328/37, 159

[56] References Cited

UNITED STATES PATENTS

| | | | |
|---|---|---|---|
| 2,991,374 | 7/1961 | De Miranda et al. | 307/221 R |
| 3,234,371 | 2/1966 | Osofsky | 307/216 X |
| 3,402,355 | 9/1968 | Hannan et al. | 307/293 X |
| 3,427,445 | 2/1969 | Dailey | 307/216 X |
| 3,474,260 | 10/1969 | Frohbach | 307/221 R |
| 3,621,283 | 11/1971 | Teer et al. | 328/37 |
| 3,638,047 | 1/1972 | Klein | 307/293 |

OTHER PUBLICATIONS

Solid State Tech. Mar. 1966 "Applications of MOS-FET's in Microelectronics" by Lohman pp. 23–29 (copy enclosed).

*Primary Examiner*—John S. Heyman
*Attorney*—Eugene M. Whitacre, H. Christoffersen and Samuel Cohen

[57] ABSTRACT

A video processing circuit operates on a serrated video signal to provide a serration-free output video signal. A configuration employs a summing circuit coupled to a charge transfer circuit which transfer circuit propagates a charge according to the timing of applied clock signals. The summing circuit provides a video signal relatively free of interfering clock transitions.

4 Claims, 22 Drawing Figures

INVENTOR.
MICHAEL G. KOVAC
BY
Arthur L. Plevy
ATTORNEY

INVENTOR.
MICHAEL G. KOVAC
BY [signature]
ATTORNEY

INVENTOR.
MICHAEL G. KOVAC
BY [signature]
ATTORNEY

CHARGE TRANSFER CIRCUITS

This invention relates to video signal processing apparatus and, more particularly, to such apparatus for use in conjunction with solid state image sensor arrays.

Serrated video signals are produced by sensor arrays wherein a charge proportional to light is transferred to provide a video signal representative of a scene.

The concept of charge transfer is usually associated with a bucket brigade circuit or a charge coupling approach and, as such, resembles a controllable delay line, wherein the charge on a capacitor is transferred according to the rate of a selected clock frequency.

In the charge transfer (i.e., bucket brigade or charge coupled) circuits, a charge accumulates at each element by the action of the incident light. However, instead of measuring the picture signal at its original site (i.e., as in an X-Y system), each row is scanned by transferring the charge pattern to the edge of the array where the video signal is formed. High resolution, halftone pictures can be transmitted provided the efficiency of transfer at each element is high and remains high at all signal levels.

As indicated, the charge is transferred by means of a clock which sequentially activates the elements to cause the transfer of charge. Due to the nature of operation of such devices in conjunction with the clock signal, the video signal appears as a serrated signal. The signal looks similar to a pulse amplitude modulated signal wherein the repetition rate of the pulse and the width of the pulse are determined by the clock frequency and duty cycle, while the amplitude of the pulse is determined by the charge developed on the elements of the array due to the incident light or due to the video signal content.

When a serrated signal is applied to a video display, the display will appear as a picture that is broken up by equally spaced vertical bars. If this signal is integrated or otherwise filtered to remove the clock signals and to obtain the video information, the resolution of the entire array is impaired. It is therefore highly desirable to provide apparatus for electrically "filling in" these serrated video signals to thereby eliminate the vertical bars in the display.

The present invention fills in serrations by utilizing a charge transfer circuit of the type employing a plurality of capacitors arranged in a delay line configuration and operative to transfer charge from one capacitor to another under control of a series of different phased clock signals. In combination with such a circuit, apparatus is provided for producing an output signal relatively free of any transitions due to the clock signals, which apparatus comprises a summing circuit having at least one input terminal for each different phase clock signal and an output terminal including a load resistor for developing across said load resistor a signal approximately equal to the sum of the signals at each input terminal. Due to the nature of the different phased signals and the operation of the summing circuit, the clock signals are cancelled and the video signal is filled in so that the output of the summing circuit provides a video signal which is substantially free from clock transitions.

If reference is made to the following specification, a complete description of the invention will be given when read in conjunction with the following figures, in which.

Figure 1:
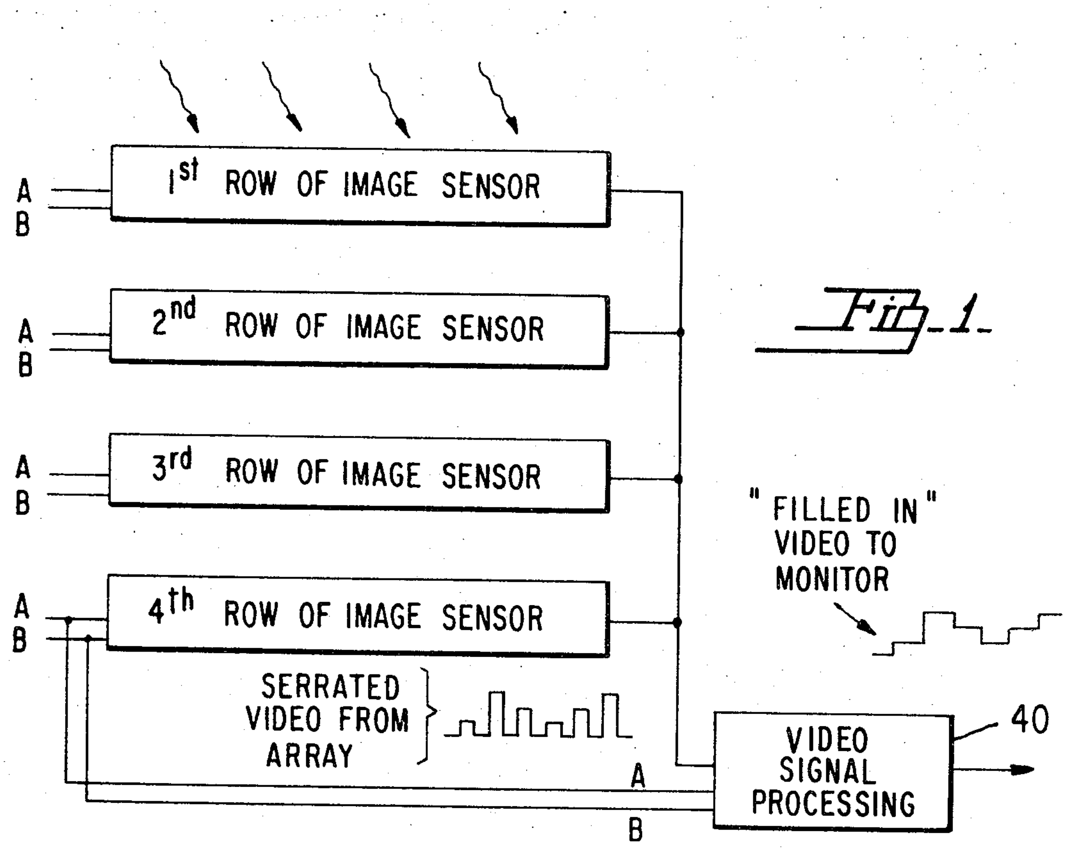
FIG. 1 is a block diagram showing a sensor array.
Figure 5:
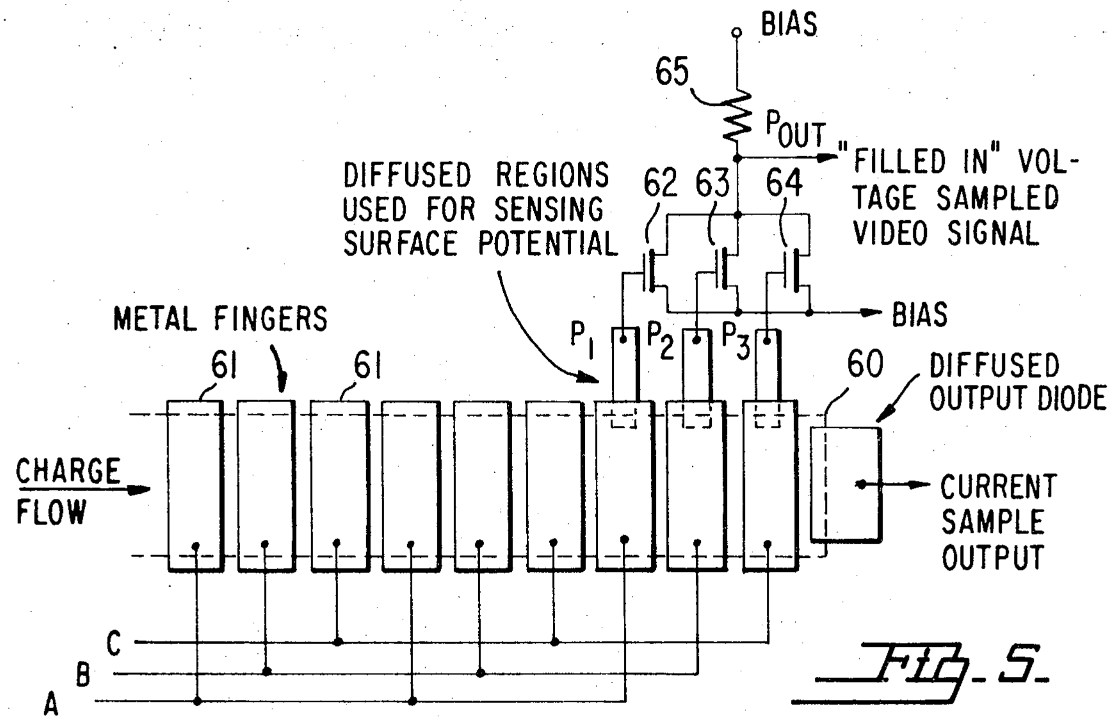
Figures 6A, 6B, 6C, 6D, 6E, 6F, 6G:
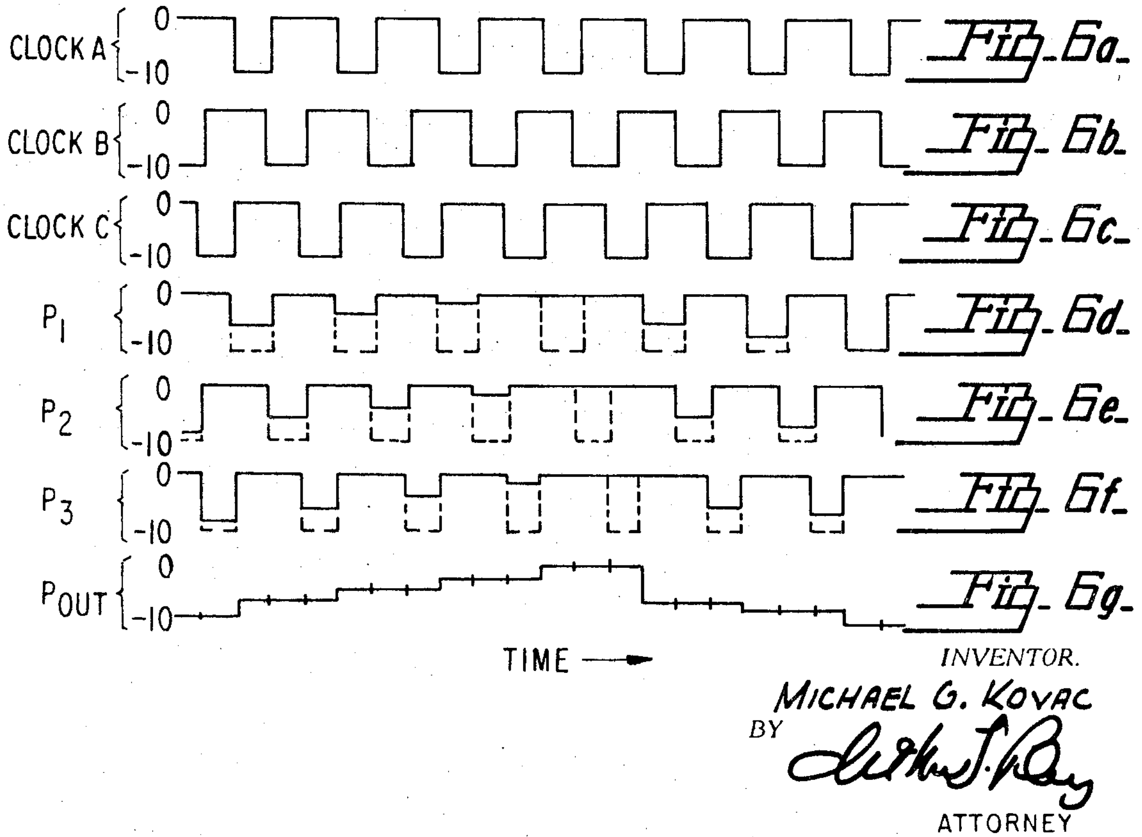

FIGS. 3*a*–3*e* are a series of waveforms useful in explaining the operation of the circuit of FIG. 1;

FIGS. 4*a*–4*g* are another series of waveforms useful in explaining the operation of a current sensitive circuit according to FIG. 1;

FIG. 5 is a further embodiment of a charge transfer and a summing circuit according to this invention;

FIGS. 6*a*–6*g* are a series of waveforms useful in explaining the operation of the circuit of FIG. 5.

Figure 2:
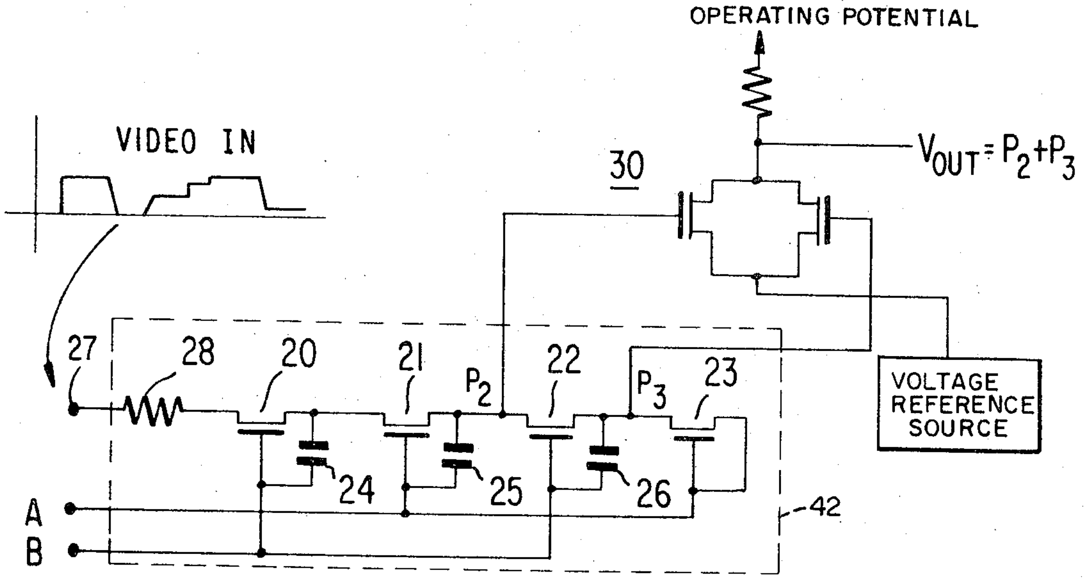
FIG. 2 is a schematic diagram of a charge transfer delay line circuit including a summing amplifier according to this invention.

Referring to FIG. 1, there is shown a complete sensing array consisting of rows of photosensitive delay lines arranged in a charge transfer configuration. Each row of the image sensor has coupled thereto antiphase clock signals designated as A and B. Each row has a common output terminal connected to a common bus for providing a sequential video signal obtained by transferring the charge indicative of the incident light successively row by row. The video signal has the characteristic as shown and designated as a "serrated video signal." This signal would be applied to a video processing circuit 40 to be described as that configuration shown in FIG. 2. In FIG. 2, a summing amplifier 30 is coupled across a suitable stage in a delay line 42 to thereby obtain the output video signal designated as "filled in video to monitor" (FIG. 1).

Referring to FIG. 2, there is shown a "bucket brigade" delay line useful with a sensing array. The delay line comprises a number of cascaded MOSFET devices designated as 20, 21, 22 and 23, respectively. The MOSFET device is well known in the art and is a metal oxide silicon field effect transistor. It is of course understood that more or less devices may be employed.

The MOSFET devices 20–22 each have a capacitor coupled between the drain and gate electrodes, while the output device 23 has its drain electrode coupled directly to the gate. The gate electrodes of devices 21 and 23 are coupled to a generator of clock pulses A, while the gate electrodes of devices 20 and 22 are coupled to a generator of clock pulses designated as B.

The input terminal 27 is connected through a resistor 28 to the source electrode of the input MOS device 20. It is to this terminal 27 that a source of video signals may be applied. Although FIG. 2 shows MOS devices as forming the bucket brigade circuit, it is obvious that bipolar devices or charge coupled devices may be utilized as well.

During the transfer of charge in the bucket brigade circuit, each MOS device functions as a source follower and not simply as an on-off switch. For example, during the negative or the on phase of the B clock, the charge is transferred from the drain of MOS 21 to the drain of MOS 22 until the source-gate potential difference of MOS 22 approaches the threshold of the device which terminates the current flow. In this way, each device is restored to its reference potential entirely by the transfer of the signal charge to the succeeding element. Using this technique very high transfer efficiencies may be obtained.

A bucket brigade type of delay line as shown in FIG. 2 may be converted into a sensing array. Photosensitive elements can be added which can introduce a charge pattern into the capacitors 24, 25, 26 prior to the application of the clock voltages. Only one sensor element is required for each pair of capacitors. Many of the well known sensor elements, such as photodiodes, phototransistors or photoconductors, could be used, but photodiodes are preferable. This is due to the inherent structure of the MOS device as reverse biased diodes already exist beneath the source and drain electrodes in an integrated MOS structure. These diodes could then be fabricated as photodiodes and thus form the array.

Referring to FIG. 3, there is shown the various waveshapes necessary to operate the bucket brigade delay line as shown in FIG. 2. (For the sake of simplicity, the threshold voltage, $V_{th}$, of the MOS transistor is assumed to be equal to zero.) It is important to note at the onset that the signal that is to be transferred through brigade bucket brigage delay line could have been introduced as an electrical input signal at terminal 27 or as an optical signal.

Figures 3A, 3B, 3C, 3D, 3E:
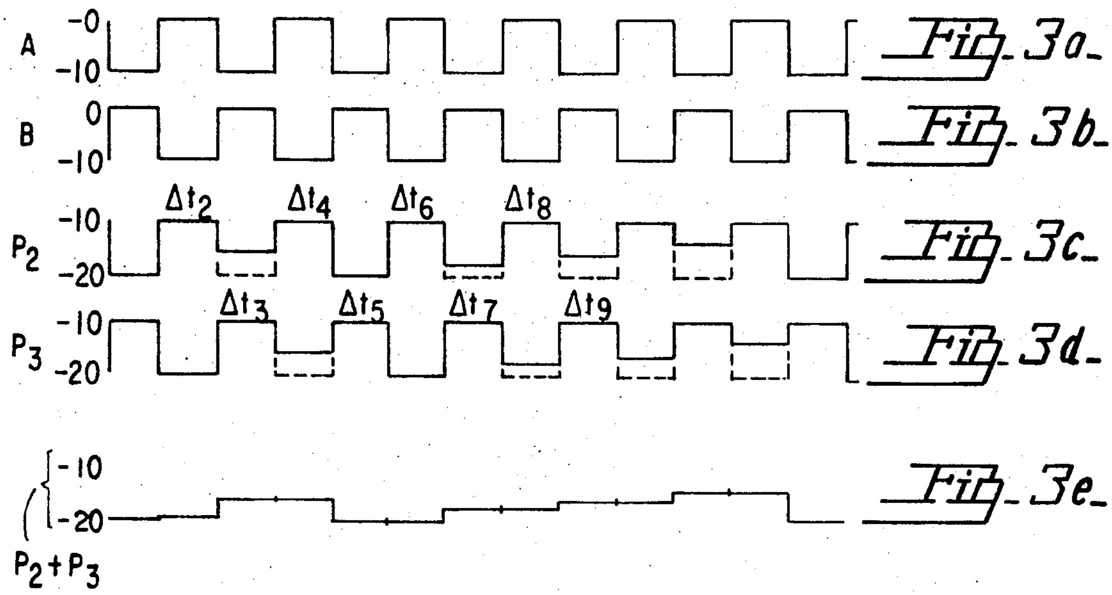

Assume that a video signal was applied at input terminal 27 of FIG. 2, and was transferred under the influence of the A and B antiphase clocks shown in FIGS. 3A and 3B. FIG. 3C represents the signal that would be available at the drain electrode of MOS 21, while FIG. 3D represents the signal available at the drain electrode of MOS 22. An inspection of the two signals reveals that they are 180 degrees out of phase with each other due to the antiphase clocks and that the signal content of FIG. 3D is advanced by one-half clock cycle when compared with the signal shown in FIG. 3C. This is so because of consequent shifting of the signal through the bucket brigade circuit. If the signal variations at the drain of MOS 21 were displayed on a television monitor, vertical bars would appear on the screen of the monitor at lines $\Delta t_2$, $\Delta t_4$ and so on.

Alternatively, if the signal at the drain of MOS 22 (FIG. 3D) were displayed, vertical bars would also appear on the screen of the monitor at lines $\Delta t_3$, $\Delta t_5$ and so on. The dashed line portions of FIGS. 3C and 3D indicate the portion of the waveform which was affected by charge transfer.

However, the sum of the waveshapes of FIGS. 3C and 3D produces the video signal shown in FIG. 3E. It can be seen that this signal is free of clock voltage swings and also has "filled in" video signals and hence the same serves to eliminate the serrations. The summed video signal fills in all the time intervals with modulated video information and thus, if the signal at FIG. 3E were viewed on a monitor, vertical bars would not be seen on the viewing screen of the monitor.

The summed signal is provided by means of a summing amplifier 30, shown in FIG. 2. One input terminal of the summing amplifier is coupled to the junction between the drain electrode of MOS 21 and the source electrode of MOS 22, while the other input terminal is coupled to the junction between the drain electrode of MOS 22 and the source electrode of MOS 23.

The summing amplifier 30 provides at an output the sum of the signals at the input terminals, where $V_{out}$ is equal to the sum of the signals shown in FIGS. 3C and 3D.

Examples of summing amplifiers 30 are known in the art and can be implemented by operational amplifiers and so on. The circuit for performing the summing amplifier operation comprises two MOS devices, having their source electrodes coupled together and returned to a source of operating potential through a load resistor. The drain electrodes are also coupled to a common point as a point of reference potential. The gate electrode of one device would be coupled to point $P_2$ and the other gate electrode coupled to $P_3$. This configuration would then provide the summed signal at the source electrode connection.

The clock voltages depicted in FIG. 3 are shown as antiphase square waves. However, as will be explained, there are a series of such bucket brigade type delay lines or charge coupling image sensors and other types of arrays which essentially perform by means of a current sampling technique.

Figures 4A, 4B, 4C, 4D, 4E, 4F, 4G:
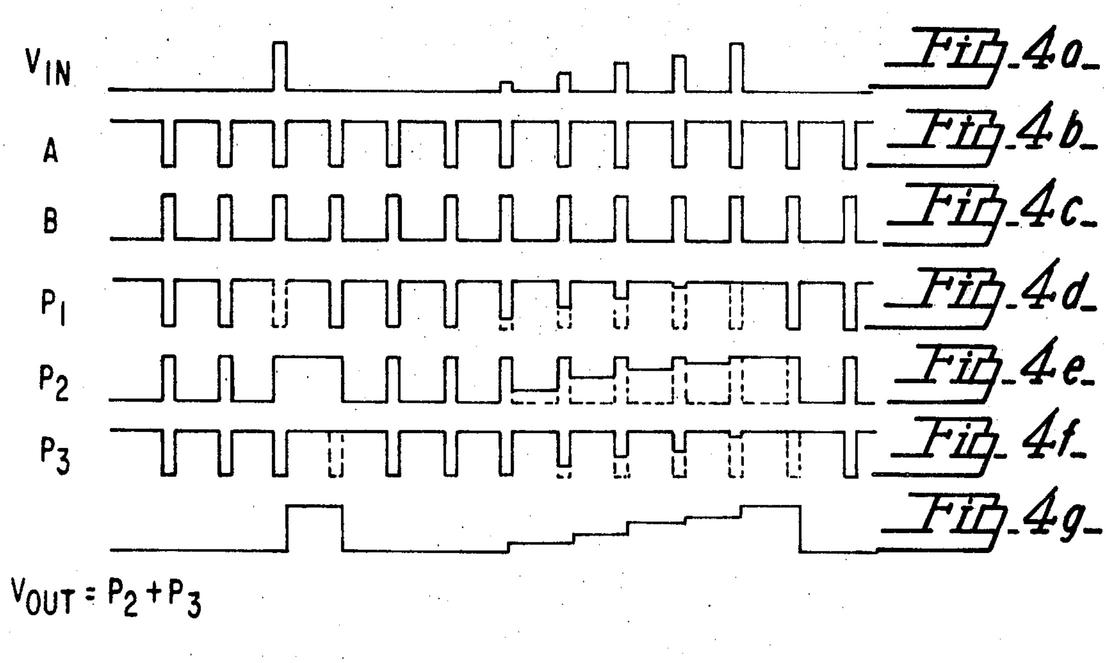

The outputs of such circuits appear as shown in FIG. 4A. As can be seen from the waveshape, the video signals consist of a set of relatively narrow spikes.

Utilizing the same circuit configuration as shown in FIG. 2, the A and B clocks of the waveform shown in FIGS. 4B and 4C are utilized.

The input signal would be that as shown in FIG. 4A and applied to terminal 27 of FIG. 2. The waveform of FIG. 4D shows the signal which would be available at the drain electrode of MOS 20 of FIG. 2.

FIG. 4E shows the signal which would be available at the drain electrode of MOS 21, while FIG. 4F shows the voltage which would be available at the drain electrode of MOS 22.

For the circuit shown in FIG. 2, the output video waveform would be that shown in FIG. 4G and obtained by the summation of the waveform shown in FIGS. 4E and 4F. It is again clearly seen from the waveform of FIG. 4G that the sharp clock transitions have been eliminated and the waveform provides a video signal having a filled in video portion with no transitions due to the applied clock frequencies to cause vertical bars to appear on a display.

The above-described circuits represent a simple and inexpensive way of eliminating the undesired serrations which would otherwise appear in a video signal propagating through a sensor type delay line as described above. The circuits function to eliminate the clock transitions by filling in the spaces, which would otherwise be present, with a video signal level which appeared subsequent to that position.

In this manner, since the same video signal is repeated for twice the time, there is no loss in effective resolution as would be attendant with filtering networks.

Furthermore, the summing amplifier arrangements are completely compatible with the integration processes that are utilized to formulate the multistage delay line and sensor arrays according to this invention.

For examples of signals which are obtained by such prior art sensing devices and for examples of operation of such devices in general, reference is made to an article entitled "Multielement Self-Scanned Mosaic Sensors" by P. K. Weimer, W. S. Pike, G. Sadasiv, F. V. Shallcross, and L. Meray-Horvath, published in THE IEEE SPECTRUM, Volume 6, No. 3, Mar. 1969, pages 52–65. The article further contains an extensive bibliography describing other types of image sensing devices and circuits for obtaining video signals therefrom.

FIG. 5 shows another type of image sensor with a sandwich type configuration comprising a first layer of silicon 60, above which a layer of silicon dioxide is formed. On top of the silicon dioxide there are deposited a series of metal fingers 61 or metal land areas.

In this device a deep depletion region is formed at the surface of the semiconductor in which minority carriers can be stored and then transferred under control of suitable signals applied to the metal fingers 61. Coupled to these metal fingers 61 are three-phase clock signals A, B, C. The first metal finger in a sequence would receive a clock at 0° (A) phase. The next device would receive a clock at 120° (B) phase and a third a clock at 240° (C) phase.

These devices are light sensitive. Light serves to generate carriers which collect at the surface of the depletion region until they are transferred. The three-phase clock serves to increase the depth of one depletion region with respect to the adjacent depletion region to allow carriers which have accumulated to be transferred from depletion region to depletion region. Because of the bilateral nature of such devices, the three-phase clock is utilized to prevent feedback from a subsequent depletion region to a prior depletion region. Due to the nature of the three-phase clock, the video signals available from such charge coupled devices are also serrated in nature. The problem in such devices is worsened due to the fact that each clock signal occurs for a shorter duration than those signals described above in conjunction with the two-phased clock approach.

The above-noted summing concept has been implemented by connecting the outputs from three successive charge coupling elements to an appropriate adder circuit which may, for example, comprise three MOS devices 62, 63 and 64 having their drain and sources in parallel with the gate electrodes going to a separate element in the sensor array which is activated by one of the three clocks.

In this manner a common load resistor 65 for the three MOS devices provides a filled in voltage sampled video signal. The gate electrodes of the MOS devices are coupled to the structure by means of diffusions which are deposited in a manner to sample the surface potential underneath the corresponding metal fingers.

In this manner the above-noted concept of adding signals developed in a charge transfer device on successive stages can be utilized to also eliminate clock transitions which otherwise would be present due to the multiphased clock signals necessary for charge transfer.

The charge coupled approach can also operate with a two-phased clock and hence the prior described summation technique is applicable to such systems.

FIG. 6 shows the waveforms developed by the circuit of FIG. 5 and those useful for transferring charge.

What is claimed is:

1. A charge transfer system comprising, in combination:

a plural stage charge transfer register comprising charge transfer elements arranged in groups of N such elements per stage, each charge transfer element coupled to the immediately following such element, and each stage for storing an information signal, where N is an integer greater than 1;

N connections for an N phase power supply, connected to the N elements of each stage, respectively, each phase signal for causing the information present in an element to shift to the next adjacent element, whereby in response to one period of said N phases, information stored as charge signal in an element of one stage is shifted out of that stage and to the corresponding element of the next adjacent stage; and a circuit for producing an output signal substantially free of serrations due to said N phase signals comprising solely a single N input circuit, each input coupled to a different element of a register stage at the end portion of said register, said circuit for sensing the charge shifted into each element of that stage by each of said N phase signals, and for producing an output voltage indicative of the value of the charge sensed at each input for the interval that charge signal remains present at that input, whereby said circuit produces an output which remains substantially constant and proportional to the charge signal shifted from element to element of a stage during one entire period of said N phase voltages and which can change to new values proportional to succeeding charge signals during succeeding periods, respectively, of said N phase voltages.

2. A circuit as set forth in claim 1 wherein said charge transfer register comprises a surface charge circuit, that is, a circuit which includes a semiconductor substrate and in which each charge transfer element is insulated from and coupled to said substrate and is capable of storing a charge signal at the surface of the substrate beneath that element.

3. A circuit as set forth in claim 2 wherein said circuit for producing an output signal comprises N metal oxide semiconductor transistors, each having a source electrode, a drain electrode, a conduction path between said electrodes, and a gate electrode, each connected at its gate electrode to a different element of a register stage, said conduction paths being connected in parallel, a load connected between one end of said said conduction paths and a first operating voltage point, a connection from the other end of said conduction paths to a second operating voltage point, and an output terminal at which said output signal appears located at said one end of said conduction paths.

4. A circuit as set forth in claim 3 wherein said charge transfer register of the bucket-brigade type.

* * * * *

UNITED STATES PATENT OFFICE
CERTIFICATE OF CORRECTION

Patent No. 3,746,883 Dated July 17, 1973

Inventor(s) Michael George Kovac

It is certified that error appears in the above-identified patent and that said Letters Patent are hereby corrected as shown below:

Column 6, Claim 4, line 52 after "register" insert ---comprises a register---

Signed and sealed this 27th day of November 1973.

(SEAL)
Attest:

EDWARD M.FLETCHER,JR.
Attesting Officer

RENE D. TEGTMEYER
Acting Commissioner of Patents